US006928643B2

(12) United States Patent
McGoogan et al.

(10) Patent No.: US 6,928,643 B2
(45) Date of Patent: Aug. 9, 2005

(54) BI-ENDIAN LIBRARIES

(75) Inventors: Sean McGoogan, Bristol (GB); Benedict Gaster, Bristol (GB); Richard Shann, Mathern Chepstow (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 615 days.

(21) Appl. No.: 09/978,850

(22) Filed: Oct. 16, 2001

(65) Prior Publication Data

US 2002/0124242 A1 Sep. 5, 2002

(30) Foreign Application Priority Data

Oct. 27, 2000 (GB) .............................................. 0026363

(51) Int. Cl.$^7$ ................................................ G06F 9/44
(52) U.S. Cl. ...................................... 717/162; 717/151
(58) Field of Search ............................... 717/162–166, 717/151, 140, 110–111

(56) References Cited

U.S. PATENT DOCUMENTS 5,960,201 A * 9/1999 Ma et al. ..................... 717/154
6,412,108 B1 * 6/2002 Blandy et al. ............... 717/152
6,578,193 B1 * 6/2003 Adams ........................ 717/139

FOREIGN PATENT DOCUMENTS

| EP | 0 729 094 A | 8/1996 |
| EP | 0 848 325 A | 6/1998 |
| WO | WO 97 44739 A | 11/1997 |

OTHER PUBLICATIONS

R.Levine, Linkers & Loaders, Oct. 11, 1999, Morgan Kaufmann Publishers, Chapter 3.*
*By Supporting Two Memory–Addressing Modes, The Power PC Can Run Any OS or Application*, Stallings, W, Sep. 1995, XP002127175.

* cited by examiner

Primary Examiner—Antony Nguyen-Ba
(74) Attorney, Agent, or Firm—Lisa K. Jorgenson; James H. Morris; Wolf, Greenfield & Sacks, P.C.

(57) ABSTRACT

A method of forming an executable program from a plurality of object code modules, each object code module comprising section data and relaxation instructions, at least one of said object code modules comprising a library module of predefined section data and relaxation instructions, the executable program to be run on a target processor having a selected endianness, the method comprising in response to a relaxation instruction, loading a library module into temporary storage; retrieving the value of a first variable, said first variable denoting the selected endianness of the target processor; comparing the value of said first variable with the endianness of the section data and relaxation instructions of the library module; in response to the result of the comparing step not being a match, converting the endianness of the section data of the library module to that of said first variable; processing the relaxation instructions and converted section data to form part of the executable program.

10 Claims, 8 Drawing Sheets

BI-ENDIAN LIBRARIES

FIELD OF THE INVENTION

This invention relates to a method and a linker for forming an executable program from a plurality of object code modules, at least one of the object code module being a library module.

BACKGROUND TO THE INVENTION

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations that are used to combine the object code modules at link time in a linker. In addition to the user generated object code modules, object code modules defining commonly used code sequences may be stored in libraries to be retrieved by the linker at link time if necessary.

One of the issues that must be resolved at the outset of any linking scheme is that of the endianness of the target processor, the target processor being the processor on which the final executable program is to run. Big-endian and little-endian are terms which refer to the order in which a sequence of bytes are stored in memory. In Big-endian architectures the most significant byte (the "big end") is stored first i.e. at the lowest memory address. In Little-endian architectures the least significant byte (the "little end") is stored first. For example, consider the number 1025 stored in a 4-byte integer. Written out in full it would appear as 00000000 00000000 00000100 00000001. The following table shows how it would be stored in big and little endian architectures:

| Address | Big-Endian | Little-Endian |
|---------|------------|---------------|
| 00 | 00000000 | 00000001 |
| 01 | 00000000 | 00000100 |
| 02 | 00000100 | 00000000 |
| 03 | 00000001 | 00000000 |

The endianness of each object code module, including the libraries must be the same as that of the target processor.

However some target processors may be bi-endian. A bi-endian processor is a processor that can use either endian system. For bi-endian processors two versions of the object code libraries are needed, one big-endian version and one little-endian version. This is clearly disadvantageous, both in terms of the time and resources expended in generating both library versions and in terms of the additional storage overhead incurred in storing both versions.

It is an aim of embodiments of the present invention to alleviate this disadvantage by providing a linker and method of linking using bi-endian libraries.

SUMMARY OF THE INVENTION

According to the present invention there is provided a method of forming an executable program from a plurality of object code modules, each object code module comprising section data and relaxation instructions, at least one of said object code modules comprising a library module of predefined section data and relaxation instructions, the executable program to be run on a target processor having a selected endianness, the method comprising: in response to a relaxation instruction, loading a library module into temporary storage; retrieving the value of a first variable, said first variable denoting the selected endianness of the target processor; comparing the value of said first variable with the endianness of the section data and relaxation instructions of the library module; in response to the result of the comparing step not being a match, converting the endianness of the section data and relaxation instructions of the library module to that of said first variable; processing the converted relaxation instructions and section data to form part of the executable program.

According to the present invention there is also provided a linker for preparing an executable program from a plurality of object code modules, each object code module comprising section data and relaxation instructions, at least one of said object code modules comprising a library module of predefined section data and relaxation instructions, the executable program to be run on a target processor the endianness of which is selectable, the linker comprising: a temporary store into which the section data and relaxation instructions of the library module may be loaded; a first variable store for holding the value of a first variable that denotes the selected endianness of the target processor; a comparator for comparing the value of said first variable with the endianness of the stored library module; a converter for converting the endianness of the section data and relaxation instructions of the stored library module to that denoted by the first variable in response to the output of the comparator; a relaxation instruction module for processing the converted relaxation instructions and section data to form part of the executable program.

According to the present invention there is also provided a computer program product for forming an executable program from a plurality of object code modules, said computer program product comprising code means having section data and relaxation instructions, at least one of said object code modules comprising a library module of predefined section data and relaxation instructions, the executable program to be run on a target processor the endianness of which is selectable, the computer program product being arranged so that, when run on a computer, the steps of the method according to any one claims 1 to 5 is performed.

For a better understanding of the present invention and to show how the same may be carried into effect, reference will now be made by way of example to the accompanying drawings.

DESCRIPTION OF THE PREFERRED EMBODIMENT

Figure 1:
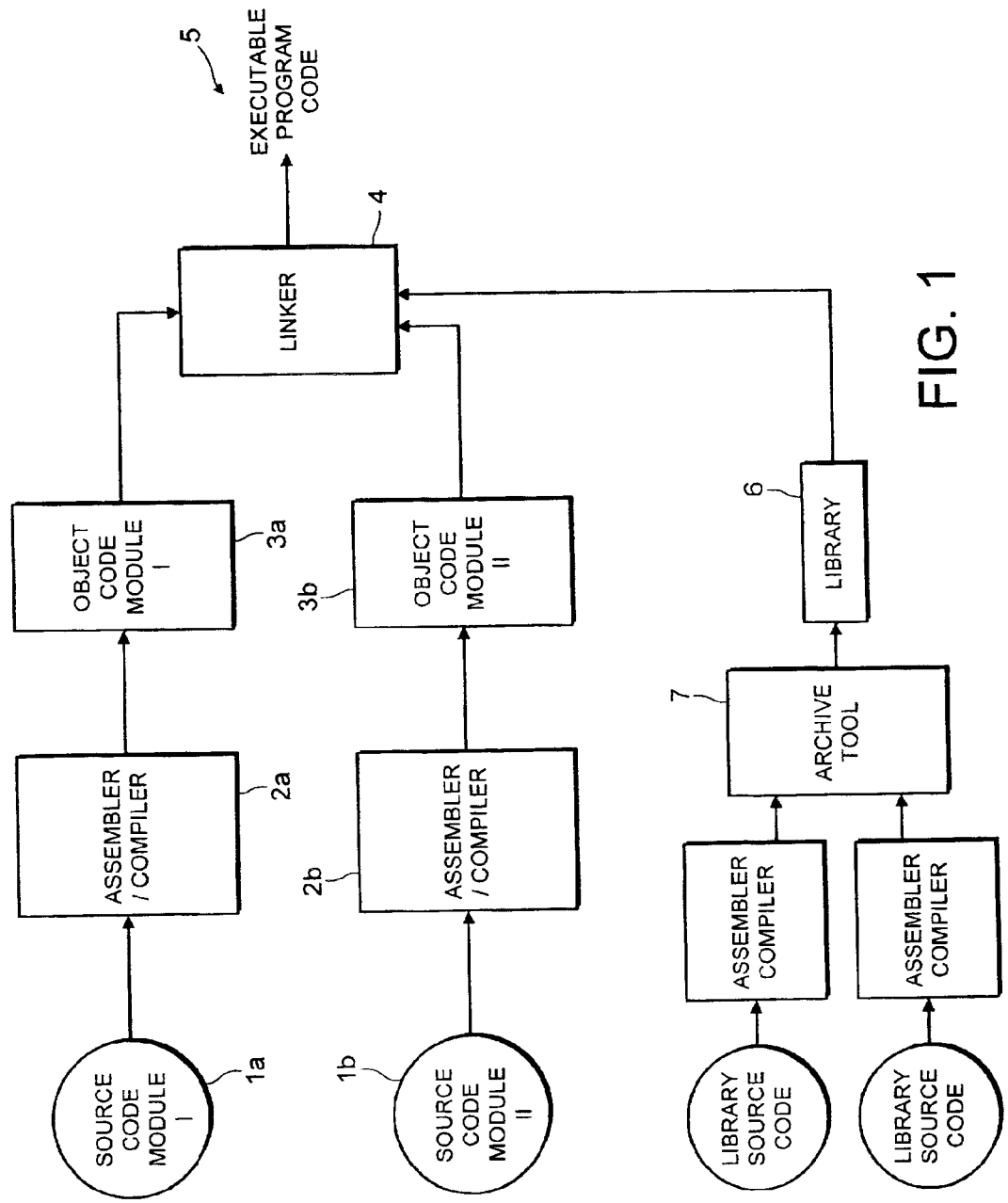
FIG. 1 is a block diagram illustrating the context of the invention.

With reference to FIG. 1, a system for linking a number of program modules to form a single executable program is shown schematically. A number of program source code modules 1a, 1b, each module written in a high level language, is provided. The particular high level language used for each source code module may vary from module to module, or alternatively all of the program source code modules may be written in the same high-level language. Each source code module 1a, 1b, is input to a respective assembler/compiler 2a, 2b which assembles and/or compiles the high level language of the source code module to produce an object code module 3a, 3b. Each object code module 3a, 3b is the low level language equivalent to each respective source code module 1a, 1b, the low level language being a language which is directly executable by a target microprocessor into which the final resulting single executable program is to be loaded. It will be appreciated that a single assembler/compiler could be used to sequentially convert a number of source code modules to respective object code modules.

Each object code module 3a, 3b is passed to a linker 4. Object code modules may be stored in libraries, such as the library 6 in FIG. 1, placed under the control of an archive tool 7. The linker combines all of the respective object code modules 3a, 3b to produce single executable programs, still in the low level language suitable for the target processor into which the program is to be loaded, although it will be appreciated that some parts of the object code modules will need to be subject to relocations before forming part of the final executable program.

For a given architecture there are often different instruction sequences for achieving the same objective depending on the values of the operands that are being handled. For example, "load a function address into a register" may be achieved in various ways depending on the address in question. When the operand is unknown before link time there is scope for re-writing the code at link time depending on the value of the operand. This re-writing of the code is a form of optimisation termed herein "linker relaxation".

In United Kingdom Patent Application No 9920905.8 in the name of the present applicant, a scheme is described for achieving linker relaxation based on information written in assembler files and passed to the linker as special relocations. The special relocations are also used for rewriting particular instruction sequences as one of a set of known alternatives.

Each execution of an assembler generates an object code module including sets of section data, each set of section data having a set of relocations generated by the assembler to describe how the section data is to be patched so as to render it compatible with other section data to form the program 5. The assembler generates these relocations. Section data comprises a plurality of code sequences executable in the final program, and data values to be accessed by the executing program.

In particular a set of "relocations" to enable link time optimisation of code is described. Conventionally a relocation describes the patching of section data or instructions with (encoded versions of) symbols. Such relocations are referred to herein as "bit relocations". In addition a number of so-called "special relocations" are discussed in GB 9920905.8 that are sometimes referred to in the following as "non-bit" relocations to distinguish from conventional "bit" relocations.

In particular, in GB 9920905.8 a "macro-call" relocation is defined that allows section data (code sequences) to be inserted from a special section (".macro" section) written to contain frequently used idioms. Section data that is to be selectively inserted into a section being optimised by the linker can be thought of as a "link time macro". It is parameterised by symbols with the substitution of the values for the parameters being performed by the linker.

One use of the macro-call relocation is to conditionally introduce selected instruction sequences from a number of alternatives into the executable program. The alternative instruction sequences are written as alternative sequences in the special macro section in the object code modules and a macro call is inserted at the point in the ordinary section wherein one or more of them may be needed. As mentioned above, the object code modules can be user defined or retrieved by the linker 4 from a library 6 as object files containing template code for insertion in the executable program wherever it is needed.

For the sake of completeness there follows the bit relocations and non-bit relocations that are discussed in the earlier application previously referred to and which have application in embodiments of the present invention.

Note that the following notation is used to name the bit relocations:

R_b<val>s<val>B<val> where <val>'s represent the number of bits, start bit and number of bytes as specified by fields of the relocation referred to as r.bits, r.bitstart, r.bytes field, where the r.bit field, represented by a lower case "b", is the number of bits that are to be patched, the r.bitstart field, represented by a lower case "s", is the least significant bit to be patched, and the r.bytes field, represented by an upper case "B", is the size of the object being patched. This is needed for big endian targets in order to find which byte the least significant bit is to be found in, and where the high order bits are.

For example R_b160b4 will patch the least significant two bytes of a four-byte object. This will be bytes at offsets 0,1 or 3,2 depending on the target endianness.

Link Time Stack Relocations

These special relocation types allow the linker to support a general-purpose stack based calculator. These relocations allow the value of symbols and constants to be pushed on the stack and a designated manipulation to be performed. Binary operations may act on the top two stack entries, or alternatively, the value passed and the top of stack (tos) entry is used. Unary operations operate on the top of the stack. Both pop their operands and place the result on the top of the stack. The full definition of the relocation types to support this is given in GB 9920905.8. There follows an example of their use:

Patch symbol plus addend in 16-bit target integer.

Figure 4:
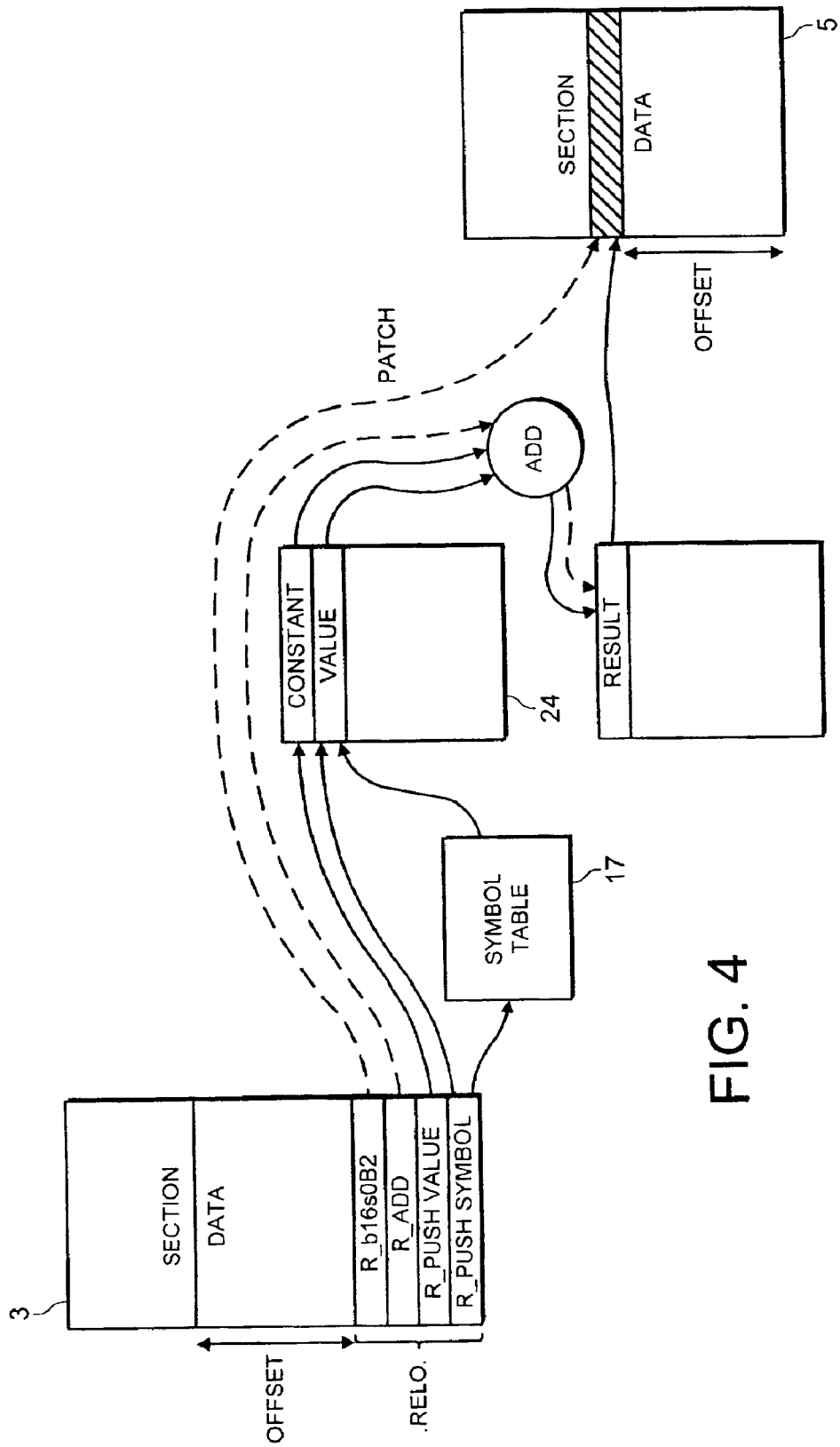
FIG. 4 is a schematic diagram illustrating an example of the use of special relocations to implement calculations.

This could be accomplished by the following ordered sequence of relocations. The effect of the sequence is illustrated schematically in FIG. 4. FIG. 4 illustrates section data and its accompanying set of relocations forming part of an object code module 3. The relocations will be read in order from the bottom in FIG. 4. The listed relocations are:
R_PUSH symbol (relocation to push value of symbol on stack)

R_PUSH value (relocation to push constant value on stack)

R_ADD (pop top two values off stack add them and push result back)

R_b16s0B2 (patch the value popped from the top of stack into the section data, 16 bits are to be patched, starting at bit 0, in target object two byte wide) all with the same offset (the offset of the instruction or data to be patched in the section).

Figure 3:
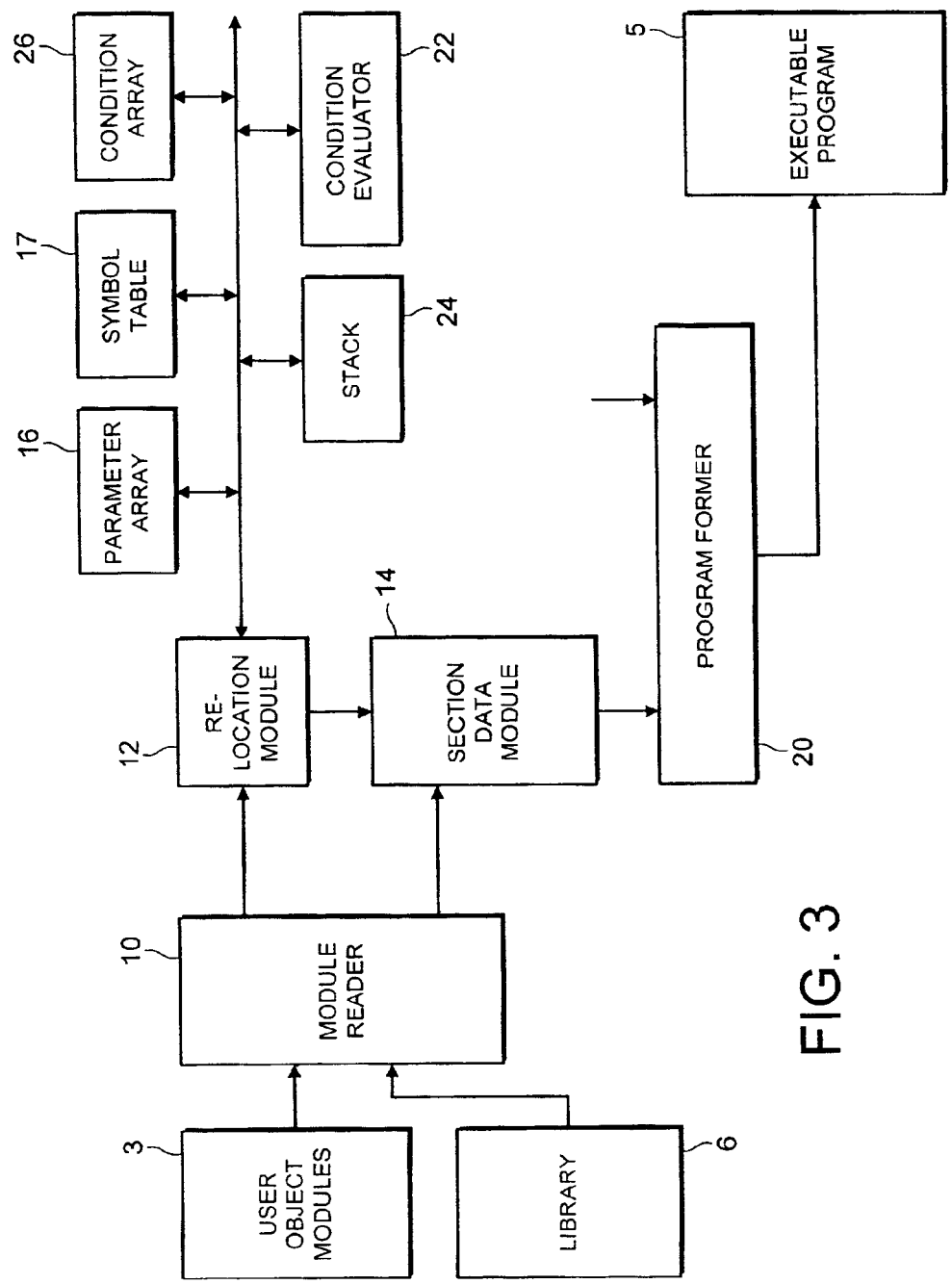
FIG. 3 is a block diagram of a linker according to the prior art.

The above relocations are implemented as described in the following with reference to FIGS. 3 and 4. The module reader 10 reads the section data and relocations. The section data is applied to the section data module 14 and the relocations are applied to the relocation module 12. The relocation module considers the first relocation, in this case R_PUSH symbol and acts accordingly to read the required value of the identified symbol from the symbol table 17 and push it onto the stack 24. The subsequent relocations are read, and the necessary action taken with respect to the stack as defined above. Finally, the last bit relocation R_b16s0B2 patches the final result value from the stack 24 into the 16-bit target integer. This patched section data is held in a section data module 14 ready for inclusion in the final program at the program former 20 unless, of course, some later relocations makes further modifications prior to completion of linking.

Conditional Relocations

Conditional relocations form a set of the non-bit relocations that allow code sequences to be conditionally included in a final executable program where all the possible alternative sequences are included in the section data of the object code module that the linker is currently examining. The code sequences that it is determined are not required are deleted at link time. The following are the non-bit relocations used to support conditional section data deletions, which are issued by the assembler responsive to special conditional Assembler Directives.

R IF

Causes the top entry to be popped from the linker's stack of values. If the value is zero then section data is skipped and the succeeding relations are ignored until R_ELSE/R_ENDIF is encountered. If the value is non-zero then relocations are processed and instructions are not deleted until R_ELSE/R_ENDIF is encountered.

R ENDIF

Defines the end of the relocations subject to the R_IF relocations, and of section data to be conditionally deleted subject to the R_IF relocation.

R ELSE

If this is encountered while section data is being taken then section data is skipped and the succeeding relocations are ignored until R_ENDIF is encountered. If encountered while skipped due to R_IF then relocations are processed and instructions are no longer deleted until R_ENDIF is encountered.

R STORE index

A value is popped from the linker's stack of values. It is put in a conditional array in the linker kept by the linker for this purpose. The value is stored at the index passed with the relocation. This relocation avoids the overhead of passing the same calculation to the linker many times over.

R FETCH index

A value is pushed on the linker's stack of values. The value pushed is the value in the condition array at the index passed with the relocation.

A further set of non-bit relocations is defined for implementing macros.

R START MACRO

The linker seeks this relocation at the offset labelled by the macro name (relocations prior to this one are not processed). It is an error if the linker encounters this instruction except on entry to a macro.

R GET PARAM index

The relocation conveys an index for accessing a parameter array in the linker. The linker reads the index'th parameter from the parameter array. If the parameter is an index in the symbol table of the linker, the symbol's value is pushed on to the linker's stack of values. Otherwise the value itself is pushed.

R EXIT MACRO

The linker stops inserting bytes/processing relocations from the .macro section. It discards the parameter array and then the macro invocation terminates.

Further non-bit relocations for Ordinary Sections include:

R PUT PARAM index

An index is passed to the linker and the value is stored by the linker in the parameter array at this index. The linker also stores the value of this relocation along with the parameter. This enables the linker to perform type checking when R_GET_PARAM is encountered.

R MACRO CALL symbol

The symbol specifies an offset in the .macro section. The relocations in .relo.macro are traversed from the R START MACRO at that offset until R EXIT MACRO is processed. Section data from the macro section are inserted in the section at the location of the R MACRO CALL relocation.

In the context of the following, relocations are referred to as relaxation instructions or RIs, for reasons that will become clear.

UK Patent Application No 0013336.3 in the name of the present applicant introduces new approaches to link time optimisation. One of these is based on the provision of an object code module as a single ordered sequence of relaxation instructions, rather than being divided into section data and relocations. Another involves the introduction of additional RIs with new semantics as discussed below. In particular, a "jump" type instruction R_GOTO is included which allows a subsequent relaxation instruction to be executed "out of sequence", as described in more detail later. Moreover, the RIs can reference state variables held by the linker. That is, there is conditional relaxation instruction discussed in the following, R_IF, which conditionally determines whether or not subsequent relaxation instructions are to be executed or skipped. It does this based on the tos (top of stack) value that can, in the described embodiment, be determined from the value of state variables held by the linker. For example, the R_IF relaxation instruction referenced to the pass number of the linker could be used to allow a user to terminate the link if the pass number reached 100. The combined effect is to allow RIs to construct a unified linker control language (LCL) that can be executed by the linker at link time.

For the sake of completeness the new RIs which have been introduced in GB 0013336.3 and which have application in the present invention are described below.

R BYTE<N>

In this instruction, each byte of the section data is represented by a value N passed by one R_BYTE instruction. N can have a value 0–255 to represent one byte of section data with the R_BYTE instruction in this format, object modules do not contain separate section data, the section data being carried by the R_BYTE instructions.

Alternatively, a further new relaxation instruction R_BYTES may be used instead of R_BYTE. The syntax of an R_BYTES instruction can be represented as R_BYTES numbytes, offset. This instruction directs the linker to copy the number of bytes of section data given by numbytes to the target executable, starting at the specified offset.

R-IF[X]

This RI specifies a following group of X RIs that are to be alternatively executed or skipped by the linker. When an R-IF[X] instruction is executed, the top value from the linker stack (see later) is read to determine if it is set at True or False (where any non-zero value denotes True). The format of the relocation is R-IF[X], where X is the number of following relaxation instructions which are to be conditionally executed (if True) or skipped (if False) by the linker. Because of the R_BYTE (or R_BYTES) relaxation instruction, the R_IF[x] can specify exactly which bytes to include in the final executable.

For the LCL of the present invention, the R IF[X] RI can be used in place of the non-bit relocation R IF described above. Although the overall effect of the R IF[X] RI is the same as for the corresponding R IF non-bit relocation, by specifying the number X of RIs to be alternatively skipped or executed there is no need for an RI corresponding to the previous non-bit relocation R ENDIF.

R-GOTO

This RI specifies the location in the ordered sequence relaxation instructions that should be executed next, with the linker operation continuing from that point. As discussed in the following, a unified instruction count is used to determine the ordered sequence. Then, for example, R-GOTO [1032] instructs the linker to jump to the RI with the unified instruction count of 1032. That RI will be executed followed by RI 1033.

R-ORG

This is a novel relaxation instruction that sets the target program counter (TPC) to the address passed by the R_ORG instruction. This relaxation instruction can be written by a user in the LCL sequence or generated by a linker responsive to an appropriate directive in the linker command line.

The relaxation instruction R_ORG distinguishes over earlier linkers that set the TPC at the start of each section being relocated in response to directives written on invocation of the linker. R_ORG can be used to provide a single ordered sequence for the entire program.

Relaxation instructions R-IF and R-GOTO can be used to provide an iterative function within the LCL. By placing an R-GOTO instruction at the end of a group of instructions which follows an R-IF instruction, with the R-GOTO instruction identifying the instruction count of the R-IF instruction, the group of instructions between the R-IF and R-GOTO instruction will be repeated until the stack value read by the R-IF instruction changes from True to False.

A simple example of this is given below which emits a series of bytes 0×0 until the program counter is four-byte aligned.

| RI | Instruction Count |
|---|---|
| R_IF<5> | 01 |
| R_PC | 02 |
| R_PUSH 3 | 03 |
| R_AND | 04 |

-continued

| RI | Instruction Count |
|---|---|
| R_BYTE <0 × 0> | 05 |
| R_GOTO <01> | 06 |

Instructions 01 to 06 are repeatedly executed until the value on the top of the stack is zero. R_PC pushes the target program counter onto the stack. This happens when the target program counter, which is incremented by 1 on each R_BYTE, has its bottom two bits clear (this is tested by the bitwise AND with the value 3, 00000011 in binary). In this case the R_IF instruction causes the program to skip 5 Instructions.

The state variables held by the linker to allow the LCL to control such things as program termination include.

| | | |
|---|---|---|
| i) | Pass Number: (LS-PASS) | This is the number of times the main section of the LCL sequence has run i.e. the number of passes the linker has made of the LCL sequence. It is incremented by 1 by the linker at each pass. |
| ii) | Changed Flag: (LS-CHANGE) | This is set FALSE by the linker at the start of each pass and becomes TRUE if a symbol which refers to a set of section data changes its value. This indicates that the target executable program has changed. |
| iii) | TPC: | The sum of the number of R-BYTE instructions (or the number of bytes emitted by an R_BYTES instruction) executed since the last R_ORG instruction was executed and the address passed by that R_ORG. |

Whenever section data is included or excluded by a relocation instruction the value of symbols labelling section data later in the pass may require to be changed. This is achieved by using a further new RI R_UPDATE_SYMBOL that is present at the location of each such symbol. This RI specifies that the symbol is to be updated, which is done by storing the TPC as its value.

Figure 2:
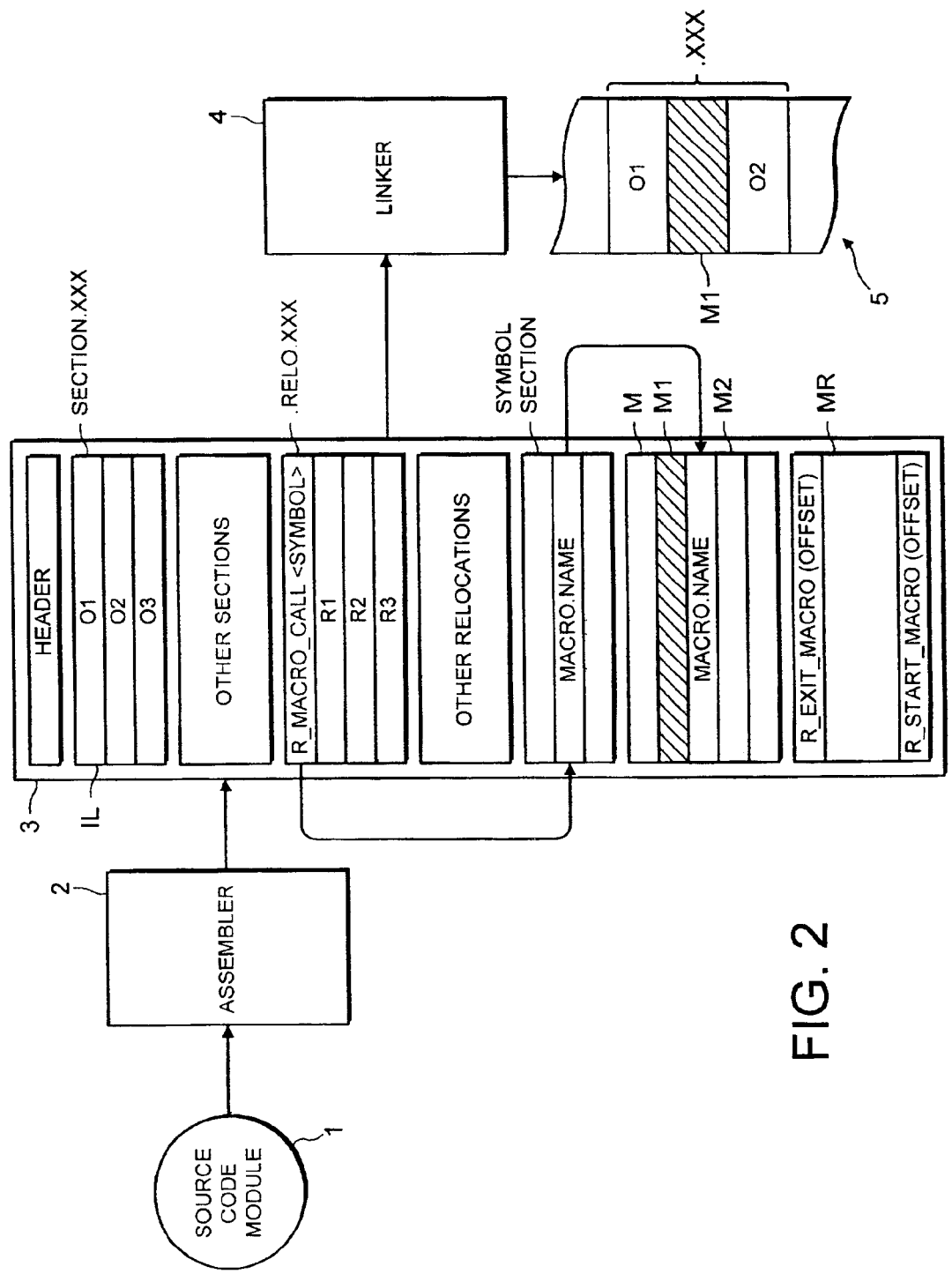
FIG. 2 is a schematic diagram showing the structure of an object module according to the prior art.

As described previously with reference to FIG. 1, existing linkers of the kind described in UK application No 9928340.0 take as an input a plurality of object code modules each having a structure of section data, relocation data, a symbol table and possible link time macros as shown in FIG. 2. These object code modules are referred to herein as Linker input modules. The linker merges then by simple concatenation of the respective section data and macro section data and by merging the relocation data, symbol tables and macro relocation sections to form a single linker output module. The merging of symbol tables and relocation sections is a well-known process.

In UK Application No 0013336.3 a unified Linker Control Language (LCL) is used to form the individual object code modules. That is R_BYTE (or R_BYTES) are used to represent section data within the stream of relaxation instructions.

It is possible to achieve the advantage of LCL without a unified stream of relaxation instructions, that is still retaining relocations separately from section data. Our earlier UK Application No. 9928340.0 explains how a linker operates using existing relocations with separate section data. R_GOTO and the ability to reference state variables provide important advantages over that scheme.

The Linker takes each input LCL object code module and merges them to form an output LCL program. The linker executes the main function of the output LCL program until a predefined instruction is encountered. Execution of the output LCL program comprises either copying specified bytes to the target executable (responsive to R_BYTE or R_BYTES RIs) or performing other types of operations responsive to other relaxation instructions.

Figure 5:
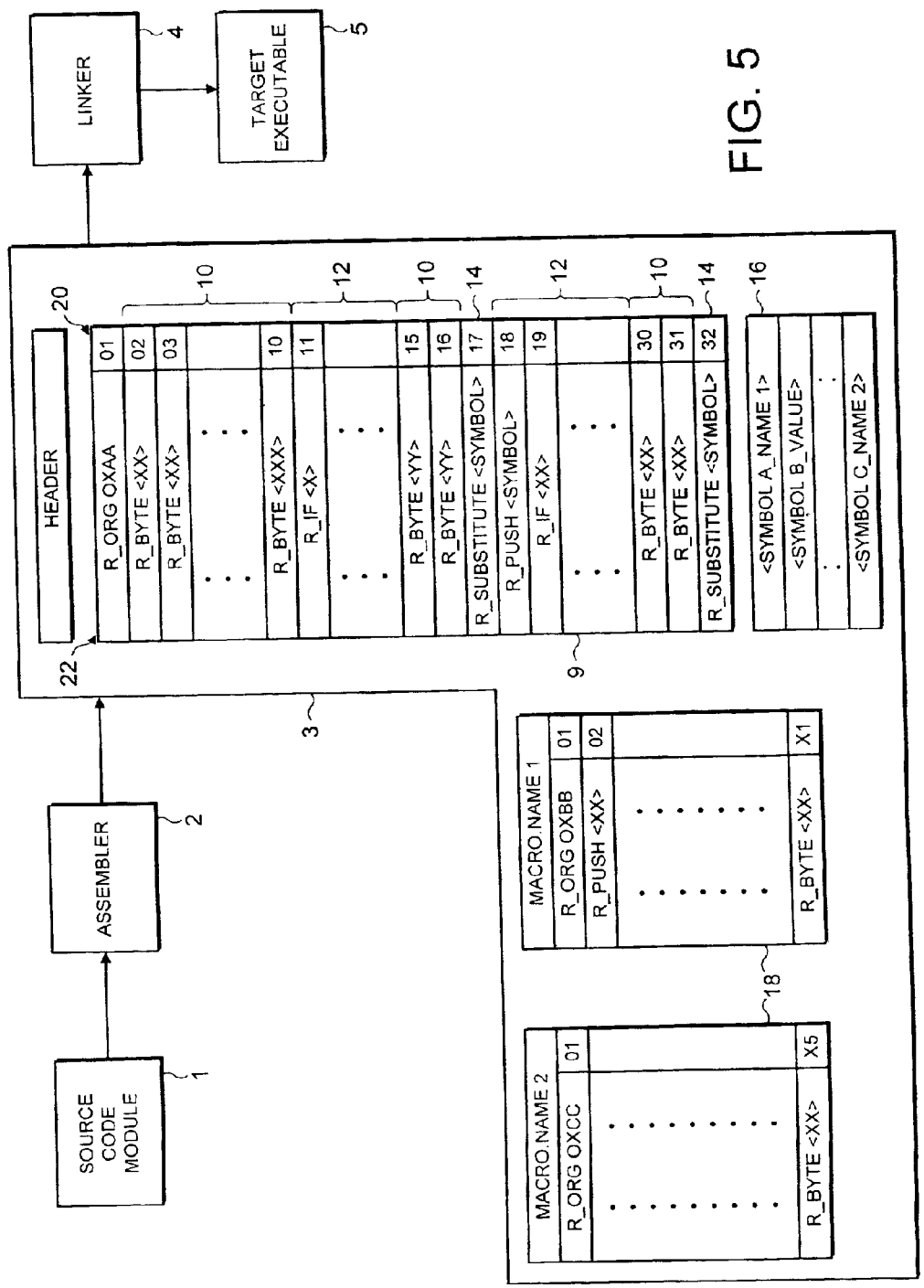
FIG. 5 is a schematic diagram of the structure of a LCL program.

The overall structure of one of the individual input LCL object code modules is shown in FIG. 5. The main function 9 of the LCL program comprises a number of RIs 22, each with an associated Unified Instruction Count 20. The first RI in the LCL can be written as R_ORG. Alternatively, R_ORG can be generated from a directive; it has the instruction count 01. The following RIs within the main function of the LCL program have sequentially incremented instruction counts.

The RIs can be considered to fall into three categories; section data 10, patching data 12 and macro section invocations 14. Patching data RIs 12 are always preceded by a section data RI 10 corresponding to the section data on which the following patching RI is to act. That is, a set of section data bytes loaded by the linker, followed by a patching RI, describing a patching operation. The section data bytes are patched according to the patching data relaxation instructions.

The LCL further comprises a symbol table 16 and may include one or more macro function 18. The macro functions 18 define section data that is to be optionally inserted into the final Target Executable. They can include frequently used idioms or routines that vary depending on the environment in which the Target Executable is to be executed. At the point in the main LCL function 9 where the section data of a macro function 18 may be required a macro invocation RI 14 is placed. The macro invocation RI used in the LCL described herein is R SUBSTITUTE <SYMBOL>, SYMBOL identifying the name of the macro function 18 by reference to the symbol table 16. Each macro function is identified by a symbol in the symbol table 16. Each macro function 18 has the same structure as the main function 9 of the LCL.

Each RI of the LCL is executed by the linker 4 in order according to its instruction count to generate the output Target Executable 5.

Figure 6:
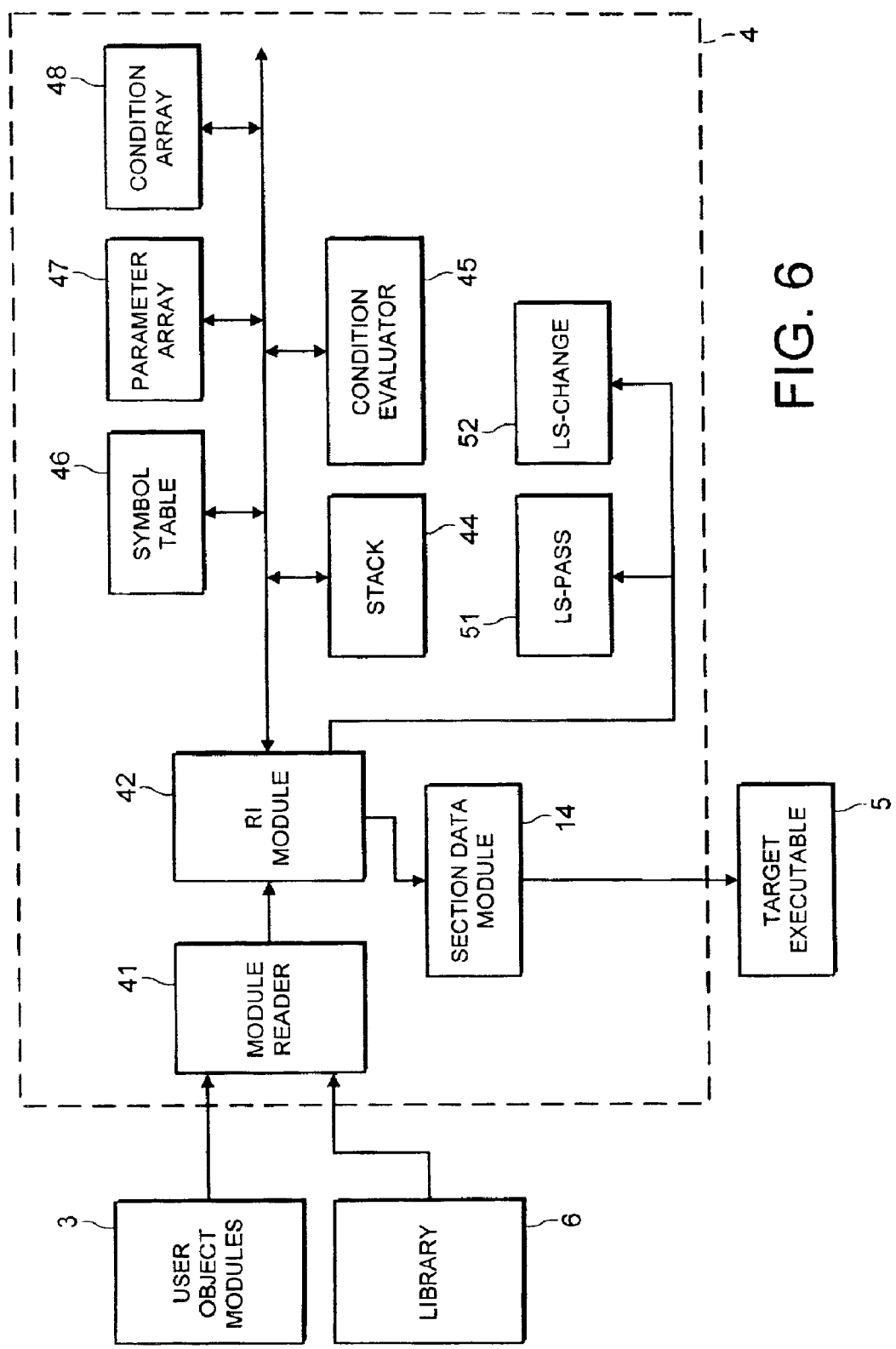
FIG. 6 is a block diagram of a linker for use with LCL programs having the structure shown in FIG. 5.

FIG. 6 is a block diagram of components of the linker used in conjunction with the LCL program described in UK Application No 0013336.0 of the present invention. It will be appreciated that in practice the linker can be constituted by a suitably programmed microprocessor. It will be understood therefore that the schematic blocks shown in FIG. 6 are for the purposes of explaining the functionality of the linker.

The LCL object modules 3 and any library LCL programs 6 are loaded into a module reader 41. Each RI of the LCL is then read from the module reader 41 by an RI module 42 in the order of their instruction count. Section data defined by an executed R BYTE instruction is copied directly by the RI module 42 to a section data module 43.

The RIs read by the RI module 42 which define relocation and patching instructions are executed by the RI module 42, utilising the linker stack 44, symbol table 46, parameter array 47, condition array 48 and condition evaluator 45 as required by the specified relocations. The execution of the RIs by the RI module 42 will normally result in a patching operation occurring in section data that has already been read. This patched section data will be the next RI read by the RI module 42 and will thus be copied to the section data module 43 as previously described.

When all of the RIs in the LCL program have been executed by the linker, the patched and unpatched section data contained in the section data module 43 may be output from the linker and from the desired Target Executable program 5 by executing the R_EXIT relocation.

Figure 7:
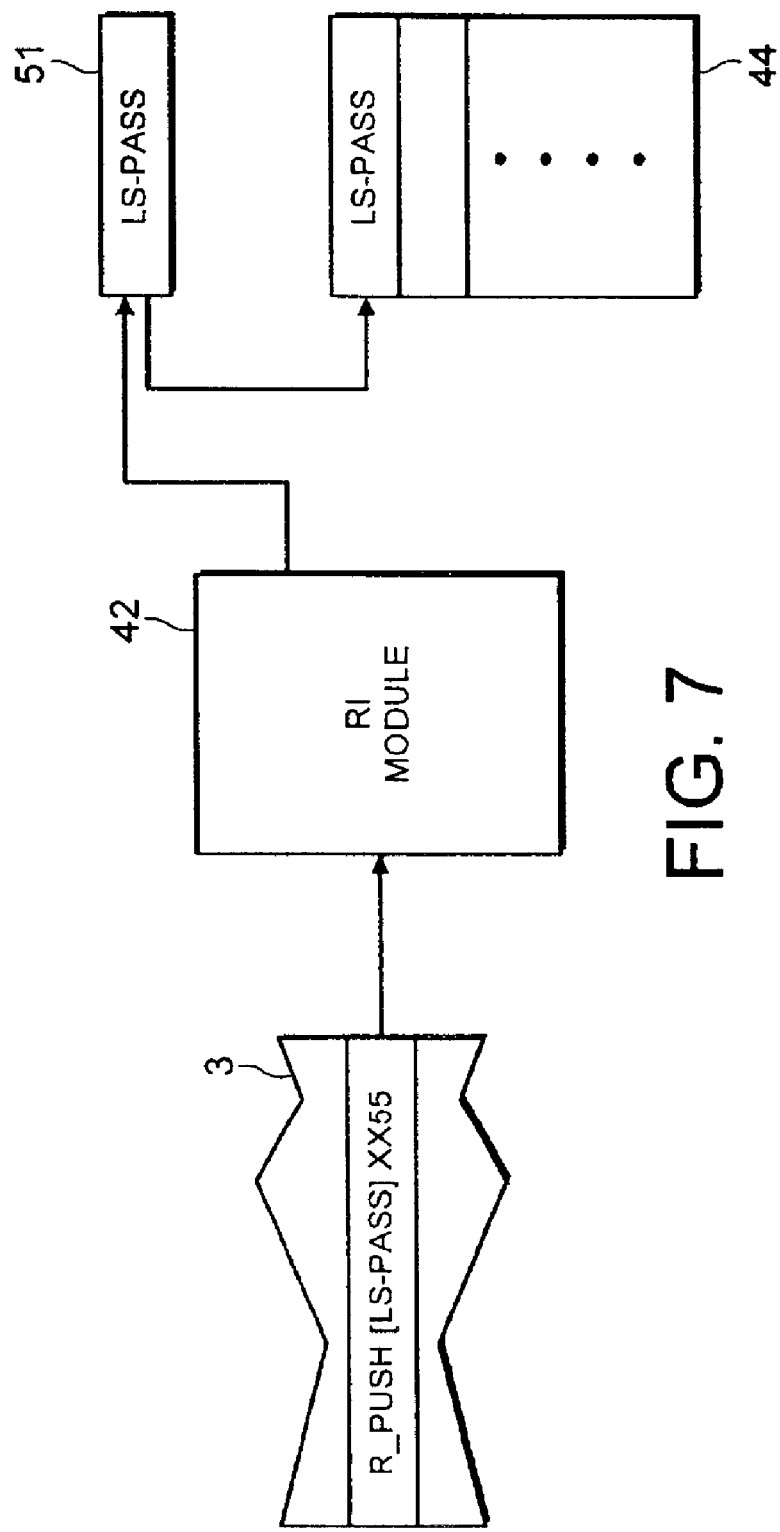
FIG. 7 is a schematic diagram showing an example of the use of a state variable in a LCL program as shown in FIG. 5.

As is known in the art, the linker may execute the LCL a number of times before the output target executable is in the optimum form. As described, the state of certain variables is recorded during each pass. The variable LS PASS and LS CHANGE are updated by the linker 4 and are stored in the variable modules LS PASS 51 and LS CHANGE 52. These variables can be used as stack values responsive to the R_IF relaxation instruction to allow state variable based conditions to be determined. These state variables may be pushed onto the top of the stack using the R_PUSH relocation referred to earlier, as illustrated in FIG. 7. The RI module 42 reads the R_PUSH [LS_PASS] RI from the LCL 3 and reads the value of the state variable LS_PASS from the variable module 51 and subsequently pushes the value of the LS_PASS onto the stack 44. The subsequent relocations are read and the necessary action taken with respect to the stack in an analogous manner to that previously defined with respect to FIG. 4.

All the previously described linkers and methods of linking object code modules experience the same disadvantages when the target processor is bi-endian, as discussed in the introduction of this application. In embodiments of the present invention described hereinafter a method of linking object code modules is described using bi-endian libraries, which reduces the disadvantages of the previously known prior art.

Within each set of section data, defined by the R_BYTE or R_BYTES relaxation instruction of the LCL described in the UK Application No 0013336.3, there are a number of different kinds of data which each have a specific data structure. Examples of the kinds of data include INT2, INT4, INT8, FLOAT4, and INSTRUCTION. In embodiments of the present invention a further new relaxation instruction is introduced into the object code modules wherever the kind of data changes. This new relaxation instruction may be one of two alternatives.

Firstly, a new location instruction R_CLASSIFICATION may be placed in the section data to mark each point at which the kind of data changes. The R_CLASSIFICATION relocation has a first sub-type which specifies the kind of data. This relocation has the effect of directly instructing the linker what the kind of data is at that location in the section data each time the R_CLASSIFICATION relocation is executed.

Secondly, and in the preferred embodiments of the present invention, a new relaxation instruction R_CLASSIFICATION comprises a compound relocation that sets a global classification state variable. As has been discussed hereinbefore with respect to UK Application No 0013336.3, a unified LCL can make use of state variables. Therefore in embodiments of the present invention a further new state variable is introduced LS_CLASSIFICATION. This variable will be updated each time a stored series of relocations comprising the relaxation instruction R_CLASSIFICATION is executed. The series of stored relocations may update the state variable LS_CLASSIFICATION by retrieving the classification of the section data held in the sub-type field of a R_CLASSIFICATION relocation instruction which is present at each point in the section where the kind of data changes. This information may then be loaded into the state variable.

A further new state variable is also introduced in embodiments of the present invention. This variable is known as LS_ENDIAN and has only two possible values e.g. 1/0 or true/false, each of the two values denoting whether the target processor is big-endian or little-endian. This variable will be set by the user at the start of each linking operation.

As previously mentioned, commonly used object code sequences may be stored in libraries to be retrieved by the linker at link time. In known linkers and methods of linking, two versions of these libraries are needed for bi-endian target processors. In embodiments of the present invention only a single library is required. Given the classification of the section data the majority of the contents of the library can be transformed from one endianness to the other. The conversion from one endianness to the other is achieved using any of the already known conversion methods. The small amounts of data that are endian dependent are stored within the library in two sub-libraries, each sub-library containing either the big-endian or little-endian version of the endian dependent code. The selection of one or the other of the sub-libraries may be made conditional on the endianness variable. The linker may then select the required sub-library and the relaxation instructions contained therein executed by the linker in a known manner.

Figure 8:
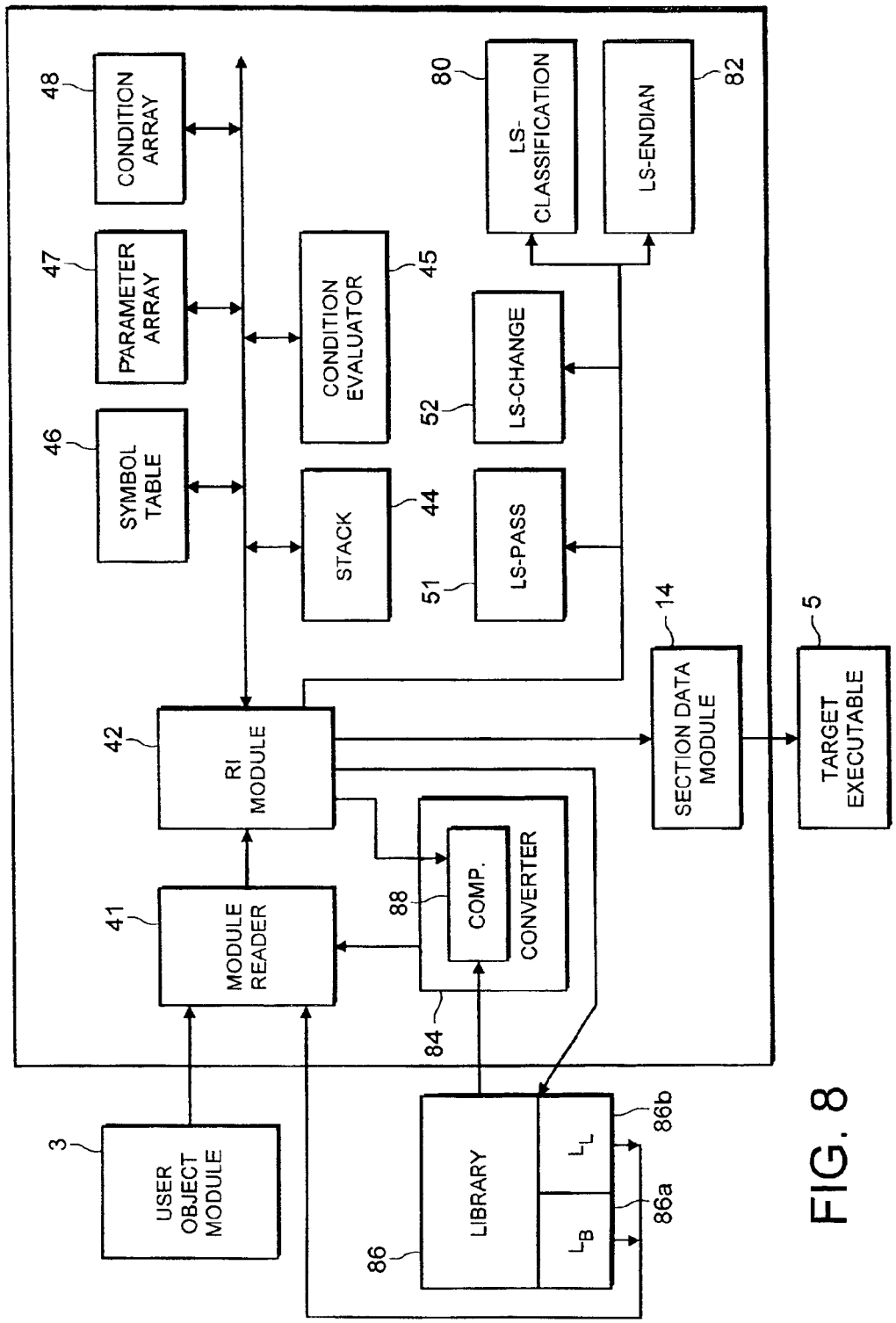
FIG. 8 is a block diagram of a linker for use with bi-endian libraries according to the present invention.

FIG. 8 schematically illustrates a linker according to embodiments of the present invention. A method of forming a target executable program for a bi-endian processor according to embodiments of the present invention will be described below with reference to FIG. 8. The linker shown in FIG. 8 is similar to that described in the applicant's co-pending application No 0013336.3 which is shown in FIG. 6. Like elements between the two linkers are referenced by identical reference numbers. Object code module 3 is read by a module reader 41 that conveys the relaxation instructions to an RI module 42. The relaxation instructions are executed by the RI module 42 using the symbol table 46, parameter array 47, condition array 48, conditional evaluator 45, stack 44 and the state variables LS_PASS 51 and LS_CHANGE 52 as previously described with reference to UK application No 0013336.3. Section data on which relaxation instructions have been executed are output to the section data module 14 before the final target executable program 5 is output from the linker. In addition, further state variable stores LS_CLASSIFICATION 80 and LS_ENDIAN 82 are provided for storing the classification and endian variables. These variables may be accessed by the RI module 42 in the same manner as LS_PASS and LS_CHANGE variables. When the relaxation module 42 receives a relaxation instruction that requires the contents of a library 86 to be retrieved, the RI module 42 firstly retrieves the value of the endianness variable from the variable store LS_ENDIAN 82, together with the classification variable from the classification store LS_CLASSIFICATION 80. Both variables are then passed to an endian converter 84, which may be any known converter for converting code from one endianness to another. The non endian dependent code from the library 86 is passed to the endian converter 84. The converter 84 includes a comparator 88 that compares the value of LS-ENDIAN with the endianness of the code from the library. If the result of the comparison is not a match i.e. the endianness of the library data differs from the required endianness denoted by the value of the variable LS-ENDIAN, the converter converts the library data to the opposite endianness, using the classification variable to maintain the data format according to the type of data presently being used. If no conversion is required the contents of the library are passed directly from the endian converter to the module reader with no conversion process occurring.

The small amounts of data that are endian dependent are held in two sub-libraries 86a, 86b as previously discussed, each sub-library holding either the big-endian or little-endian version of the endian dependent data. The RI module 42 selects the code from the appropriate sub-library depending on the value of the endianness variable retrieved from the variable store LS_ENDIAN 82. The appropriate library code is read directly by the module reader 41 before being passed to the RI module 42.

Once the module reader 41 has read the contents of the main library 86 and sub-libraries 86a and 86b the relaxation instructions contained therein are executed by the RI module 42 as previously discussed in our earlier application UK Application No 0013336.3.

What is claimed is:

1. A method of forming an executable program from a plurality of object code modules, each object code module comprising section data and relaxation instructions, at least one of said object code modules comprising a library module of predefined section data and relaxation instructions, the executable program to be run on a target processor having a selected endianness, the method comprising:

in response to a relaxation instruction, loading a library module into temporary storage;

retrieving the value of a first variable, said first variable denoting the selected endianness of the target processor;

comparing the value of said first variable with the endianness of the section data and relaxation instructions of the library module;

in response to the result of the comparing step not being a match, converting the endianness of the section data of the library module to that of said first variable; and processing the relaxation instructions and converted section data to form part of the executable program.

2. A method according to claim 1, wherein said library module further comprises a first sub-library comprising section data and relaxation instructions of a first endianness and a second sub-library comprising section data and relaxation instructions of a second endianness, the information content of said first and second sub-libraries being the same and not being convertible from one endianness to the other, whereby said relaxation instructions and section data of only one of said first or second sub-libraries are processed in dependence on the value of said first variable.

3. A method according to claim 1, wherein said relaxation instructions include an instruction of a first kind for denoting the data type of subsequent section data.

4. A method according to claim 3, wherein said relaxation instruction of the first kind comprises setting the value of a classification variable denoting the data type.

5. A method according to claim 4, wherein said conversion step includes reading the value of said classification variable and outputting said converted section data in the data type denoted by the value of said classification variable.

6. A linker, tangibly embodied in and executed by a computer, for preparing an executable program from a plurality of object code modules, each object code module comprising section data and relaxation instruction, at least one of said object code modules comprising a library module of predefined section data and relaxation instructions, the executable program to be run on a target processor the endianness of which is selectable, the linker comprising:

a temporary store into which the section data and relaxation instructions of the library module may be loaded;

a first variable store for holding the value of a first variable that denotes the selected endianness of the target processor;

a comparator for comparing the value of said first variable with the endianness of the stored library module;

a converter for converting the endianness of the section data of the stored library module to that denoted by the first variable in response to the output of the comparator; and a relaxation instruction module for processing the relaxation instructions and converted section data to form part of the executable program.

7. A linker according to claim 6, wherein said library module further comprises a first sub-library comprising section data and relaxation instructions of a first endianness and a second sub-library comprising section data and relaxation instructions of a second endianness, the information content of said first and second sub-libraries being the same and not being convertible from one endianness to the other.

8. A linker according to claim 6, further comprising a second variable store for holding a second variable the value of which denotes the data type of subsequent section data.

9. A linker according to claim 8, wherein the converter is responsive to the value of said second variable whereby the converter outputs converted section data of the type denoted by the value of the second variable.

10. A computer program product comprising code means for forming an executable program from a plurality of object code modules and having section data and relaxation instructions, at least one of said object code modules comprising a library module of predefined section data and relaxation instructions, the executable program to be run on a target processor the endianness of which is selectable, the computer program product being arranged so that, when run on a computer, the computer, in response to a relaxation instruction, loads a library module into temporary storage;

retrieves the value of a first variable, said first variable denoting the selected endianness of the target processor;

compares the value of said first variable with the endianness of the section data and relaxation instructions of the library module;

in response to the result of the comparing step not being a match, converts the endianness of the section data of the library module to that of said first variable; and processes the relaxation instructions and converted section data to form part of the executable program.

* * * * *